July 7, 1942.   E. BLETZ   2,289,095

BIMETALLIC LINK MOUNTING

Filed Feb. 27, 1941

WITNESSES:
C. J. Weller.
F. C. Hepler.

INVENTOR
Edward Bletz.
BY W. R. Coley
ATTORNEY

Patented July 7, 1942

2,289,095

UNITED STATES PATENT OFFICE 2,289,095

BIMETALLIC LINK MOUNTING

Edward Bletz, Lexington, Ohio, assignor to Westinghouse Electric & Manufacturing Company, East Pittsburgh, Pa., a corporation of Pennsylvania Application February 27, 1941, Serial No. 380,847

7 Claims. (Cl. 200—139)

My invention relates to bimetallic thermostats and more particularly to the mounting of the bimetallic element therefor.

An object of my invention is to provide a positive mounting arrangement for a thermostatic element and positive means for controlling the operation thereof.

A further object of my invention is to provide a thermostat having a bimetallic element which is rigidly attached to a supporting structure by means of a mounting device attached at substantially the midpoint of the element.

Still another object of my invention is to provide a thermostat having a three-legged bimetallic element in which the central leg is rigidly attached to a supporting structure with an adjusting device attached to an end portion of the element for adjustably controlling the operation thereof.

A further object of my invention is to provide a thermostat having a three-legged bimetallic element embodying an end portion and adjusting means rigidly attached to said end portion for tilting such end portion to control the operation of the element.

Still another object of my invention is to provide a thermostat having a three-legged bimetallic element, substantially the midpoint of the central leg being rigidly attached to a supporting structure, which is adjustably controlled by means of an adjusting device that is rigidly attached to an end portion thereof and rotatable about a transverse axis through such end portion for changing the curvature of the bimetallic element.

Other objects of my invention will either be pointed out specifically in the course of the following description of a device embodying my invention or will be apparent from such description.

Figure 1:
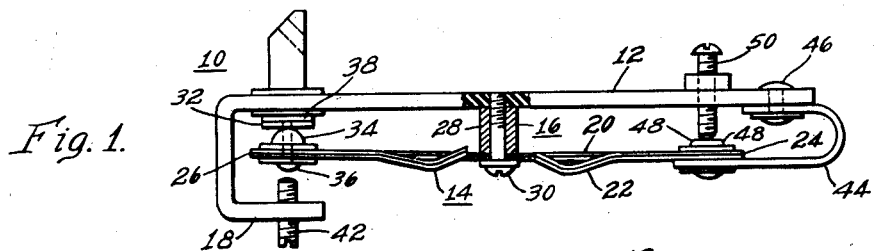
Figure 1 is a side elevational view partly in section of a thermostat embodying my invention.
Figure 2:
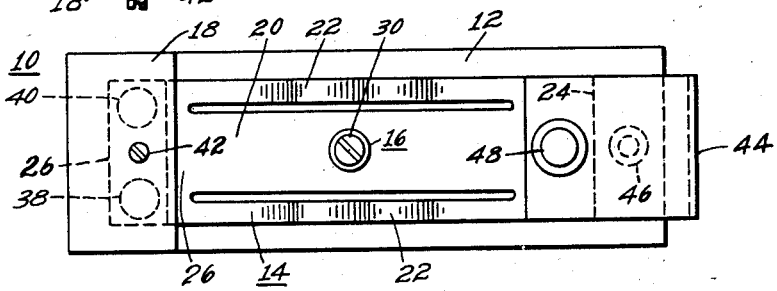
Fig. 2 is a bottom plan view of the device shown in Fig. 1.
Figure 3:
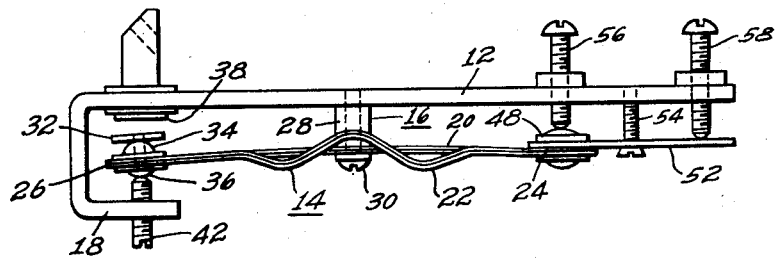
Figure 4:
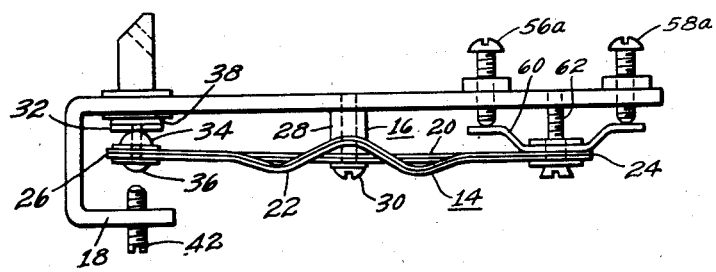
Figure 5:
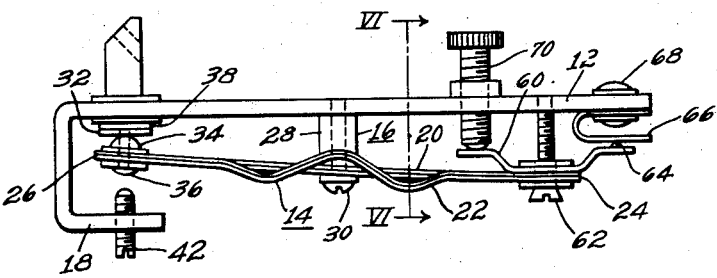
Figure 6:
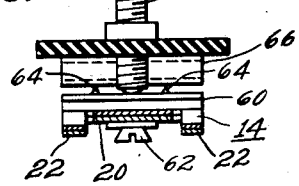

Figs. 3, 4, and 5 are views similar to Fig. 1 illustrating modified forms of an adjusting device which is used to control the operation of the bimetallic element; and Fig. 6 is a sectional view taken along line VI—VI of Fig. 5.

Referring to the accompanying drawing, in which like characters indicate like parts in the several figures, a thermostat 10 is illustrated as comprising a supporting structure 12, and a bimetallic member 14, which is rigidly attached to the supporting structure 12 by a suitable centrally located mounting device 16 and is adjustably controlled by means attached to an end of the bimetallic element 14, which means rotates such end portions so as to vary the curvature of the element.

The supporting structure 12 comprises, in this instance, an elongated strip-type metallic member which has a depending inwardly extending ledge 18 formed integral therewith. However, the supporting structure 12, while being, in this instance, an elongated integral structure, may be formed in any other suitable shape or manner or from other material. Stationary contacts 38 and 40 and suitable terminal structures therefor are insulatedly attached, in a well known manner, to the supporting structure 12. Such contacts are preferably positioned on the lower side of the metallic member and above the ledge 18.

The bimetallic element 14 comprises, in this instance, an elongated, inherently snap-acting, strip-type member of a known form having a central strip 20 and two exterior strips 22. The exterior strips 22 each have a crimped central portion which, in effect, reduces their length with respect to the central strip so as to make the bimetallic element inherently snap-acting in action. The strips 20 and 22 are joined at their ends by means of end portions 24 and 26.

The bimetallic element 14 is rigidly attached to the supporting structure 12 by means of the centrally located mounting device 16, which comprises, in this instance, a substantially cylindrical spacer washer 28 and a set screw 30. The screw 30 passes through an opening located at substantially the midpoint of the central strip 20 and the spacer washer 28, and threadedly or otherwise engages the supporting structure 12 so as to rigidly attach the central strip 20 to the supporting structure (see Fig. 1). With the central strip of the bimetallic element 14 rigidly attached to the supporting structure 12 in such a manner, it follows that the end portions 24 and 26 are free to move with respect thereto.

A bridging contact 32 is loosely attached to the movable end portion 26 of the bimetallic element 14 by means of a semi-spherical collar 34 and a rivet-like member 36. The bridging contact 32 is loosely positioned upon the collar 34 so as to make positive contact with the stationary contacts 38 and 40, in a well known manner. The bridging contact 32 is thus adapted to move with the end portion 26 of element 14 as such element snaps from, say, its operative position as shown in Fig. 1 to its inoperative or disengaged position as shown by Fig. 3. A suitable set screw 42 is threadedly engaged within the ledge 18 of the supporting structure 12 to adjustably limit the downward movement of the end portion 26 of the element 14.

Referring to Fig. 1, I show the other end portion 24 of the bimetallic element 14 attached to the supporting structure 12 by means of resilient member 44. Resilient member 44 is, in this instance, formed into substantially a J-like figure with the shorter end rigidly attached to the supporting structure 12 by means of a suitable rivet 46. The other end of resilient member 44 is rigidly attached to the end portion 24 of the bimetallic element 14 and tends to limit its movement when the element 14 snaps from one position to another. The resilient member 44 is attached to the bimetallic element 14 by means of a suitable rivet-like structure 48 which is adapted to engage an adjusting screw 50.

The adjusting screw, by engaging the rivet structure 48 determines the position of the end portion 24 and, in addition, permits an operator to selectively tilt or adjust the angular position of the end portion 24, thus permitting the operator to change the curvature of the bimetallic element 14 as a whole. By changing the angle of or tilting the end portion 24 about a transverse axis therethrough, the operation of the bimetallic element 14 may be selectively controlled. As the set screw 50 is run downwardly towards the end portion 24 of the bimetallic element, it follows that since the central point of the bimetallic element 14 is rigidly attached to the supporting structure the end portion 24 is rotated or in effect tilted about a transverse axis passing through the end portion 24 and, in addition, in this instance, gradually moved downwardly in an arcuate counterclockwise direction. This, in turn, causes the opening temperature of the element to be correspondingly lowered. Conversely, by backing the screw 50 up with respect to supporting structure 12, the opening temperature of the element is correspondingly raised.

It is to be understood that the resilient member 44, while permitting the end portion 24 of element 14 to be tilted and slightly moved in an arcuate manner, retains the end portion 24 in a substantially fixed position (whatever position in which it has been preset by set screw 50) during the normal operations of the element 14. However, the second or contact-carrying end portion 26 of the bimetallic element 14 is free to snap downwardly or upwardly as the temperature of the element is varied throughout its operation. It, therefore, follows that the adjusting screw 50 regulates the operation of the element by tilting or rotating the end portion 24 about an axis passing therethrough.

Referring to Fig. 3, I show a modified form of an adjustable support for the end portion 24 of the bimetallic element 14, namely, an elongated plate 52 which is rigidly attached to such end portion by means of the rivet 48. The plate 52 is fulcrumly attached to the supporting structure 12 by means of a suitable screw member or fulcrum 54 which passes through the plate 52 at substantially the midpoint thereof. The angular position of the plate 52 is then controlled and adjusted by means of two adjusting locking or set screws 56 and 58, which pass downwardly through support 12. The adjusting screw 56, in this instance, engages the rivet 48 while the adjusting screw 58 engages the free end of the plate 52.

Accordingly, it is obvious that by running the adjusting screw 56 downwardly towards the element 14 and by backing the adjusting screw 58 upwardly towards the supporting structure 12, the plate 52 would be rotated about the fulcrum 54 in a counterclockwise direction. By rotating the plate 52 in such a counterclockwise direction, the fixed end portion 24 attached to the plate 52 will be rotated in a clockwise direction with respect to the element 14. By moving the end portion 24 in such a manner, it follows that since the central point of the element 14 is rigidly attached to the supporting structure, such end portion, in effect, is tilted about a transverse axis passing through said end portion. However, actually, the end portion 24, in this instance, is tilted or rotated and bodily moved in an arcuate manner also, somewhat similar to that hereinbefore described.

By moving the end portion 24 in such a manner, which, in effect, is similar to that hereinabove described, the operation of the bimetallic element is selectively controlled. It, therefore, follows that an operator may control the operation of the bimetallic element by adjusting the position of the set screws 56 and 58, or, in other words, by rotating or fulcruming the plate 52 about the fulcrum pin 54.

Referring to Fig. 4, I show a fulcruming plate 60 of another form which is suitably rigidly attached to the end portion 24 of the bimetallic element 14 at a point intermediate the ends of such fulcruming member. A fulcruming pin or screw 62 passes through the end portion 24 of element 14 at the midpoint of fulcruming plate 60 and is attached to the supporting structure 12 in any well known manner. The plate 60 is of a flattened U-shape, and the horizontally-extending ends thereof engage suitable adjusting set screws 56a and 58a similar to screws 56 and 58 hereinabove described.

The adjusting screws 56a and 58a may be selectively lowered or raised to rotate the fulcruming plate 60 about the pin 62. However, by having the end portion 24 of element 14 rigidly attached to the midpoint of plate 60, it follows that the end portion 24 only rotates about a transverse axis passing therethrough, in contrast to the compound movement, including an arcuate and a tilting movement, hereinabove described. By so rotating the end portion 24 of the bimetallic member 14, the operating characteristics of the bimetallic element 14 are selectively controlled and regulated by an operator without any vertical bodily movement of the end portion 24.

Referring to Figs. 5 and 6, I show the preferred arrangement for adjusting the angular or tilted position of the end portion 24 of the bimetallic element 14. The plate 60 is rigidly attached to the end portion 24 of the element 14 in a manner hereinabove described. The plate 60, in this instance, has a plurality of upwardly extending bosses 64 at one end thereof which engage one end of a U-shaped resilient member 66. The other end of the U-shaped member 66 is rigidly attached to the supporting structure 12 by means of a rivet 68. The resilient member 66, by engaging the bosses 64, biases the fulcruming plate 60 in a clockwise direction. However, the plate 60 is retained in any desired position by means of engagement with an adjusting screw 70 which is threadedly engaged with the supporting structure 12. The adjusting screw 70 may be independently rotated so as to selectively tilt or rotate the fulcruming plate 60 (in conjunction with resilient member 66), and, therefore, the end portion 24 of the bimetallic element. By varying the vertical position of the adjusting screw 70 it follows that the angular position of end portion 24 is changed and the curvature of the bimetallic element 14 is varied so as to regulate the operation of the element.

Further modifications may be made in the device embodying my invention without departing from the spirit and scope thereof, and I desire, therefore, that only such limitations shall be placed thereon as are imposed by the prior art and the appended claims.

I claim as my invention:

1. In a thermostat having a supporting structure and a bimetallic element attached to the supporting structure embodying a central strip and two exterior strips joined at each end by end portions, the combination of a mounting device rigidly attached to the midpoint of the central strip of the bimetallic element for attaching the element to the supporting structure, a movable contact attached to one end portion, and adjusting means for rocking the second end portion about a transverse axis through said second end portion for regulating the operation of the bimetallic element.

2. In a thermostat having a supporting structure and a bimetallic element embodying a central strip and two exterior strips joined at each end by end portions, the combination of attaching means engaging an intermediate point of the central strip of the bimetallic for attaching said bimetallic element to the supporting structure, and means engaging an end portion of the bimetallic element for rocking and bodily moving said end portion with respect to the supporting structure for selectively regulating the operation of said bimetallic element.

3. A thermostatic device comprising a supporting structure, a bimetallic element embodying a central strip, two exterior strips and end portions joining the ends of said strips, means engaging the central strip for attaching the central strip to the supporting structure, means comprising a resilient member rigidly attached to an end portion for tiltably supporting said end portion, and adjusting means engaging said end portion for bodily moving said end portion, whereby said end portion is rotatively moved with respect to the supporting structure for adjustably controlling the operation of the bimetallic element.

4. A thermostatic device comprising a supporting structure, a bimetallic element embodying a central strip and two exterior strips joined by an end portion, means for attaching a point in the central strip to the supporting structure, and means attached to the end portion for rocking said end portion with respect to the supporting structure, said last means comprising an elongated member extending along the longitudinal axis of the bimetallic member, fulcruming means engaging said member intermediate the ends thereof for attaching said member to the supporting structure, and adjusting screws one each engaging the ends of said member for selectively determining the angle thereof for rocking the end of said bimetallic element and controlling the operation thereof.

5. A thermostatic device comprising a supporting structure, a bimetallic element embodying a central strip and two exterior strips joined by an end section, means for rigidly attaching the central strip to the supporting structure, and means attached to the end portion for rotating said end portion about a transverse axis through such end portion for regulating the operation of the bimetallic element.

6. A thermostatic device comprising a supporting structure, a bimetallic element embodying a central strip and two exterior strips joined by an end section, means for rigidly attaching the central strip to the supporting structure, and means rigidly attached to the end portion for rotating said end portion about a transverse axis through such end portion for regulating the operation of the bimetallic element, said last means comprising a member attached intermediate the ends thereof to the element, means fulcrumingly engaging said member and end portion for permitting rotative movement only of said member and portion, and means engaging the ends of said member for rotating said member and end portion for regulating the operation of the element.

7. A thermostatic device comprising a supporting structure, a bimetallic element embodying a central strip and two exterior strips joined by an end section, means for rigidly attaching the central strip to the supporting structure, and means rigidly attached to the end portion for rotating said end portion about a transverse axis through such end portion for regulating the operation of the bimetallic element, said last means comprising a member attached intermediate the ends thereof to the element, means fulcrumingly engaging said member and end portion for permitting rotative movement only of said member and portion, adjusting means engaging one end of the member for adjusting the position thereof, and resilient means engaging the second end of said member, whereby an operator may operate the adjusting means to rotate the end portion of the bimetallic element.

EDWARD BLETZ.